United States Patent
Kolding et al.

(10) Patent No.: US 11,546,801 B2
(45) Date of Patent: Jan. 3, 2023

(54) TRAFFIC DISTRIBUTION CONTROL FOR WIRELESS HYBRID ACCESS NETWORKS

(71) Applicant: Nokia Technologies Oy, Espoo (FI)

(72) Inventors: Troels Emil Kolding, Klarup (DK); Frank Frederiksen, Klarup (DK); Daniela Laselva, Klarup (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/639,318

(22) PCT Filed: Aug. 18, 2017

(86) PCT No.: PCT/EP2017/070912
§ 371 (c)(1),
(2) Date: Feb. 14, 2020

(87) PCT Pub. No.: WO2019/034258
PCT Pub. Date: Feb. 21, 2019

(65) Prior Publication Data
US 2021/0037422 A1    Feb. 4, 2021

(51) Int. Cl.
*H04W 28/10* (2009.01)
*H04B 7/185* (2006.01)
(Continued)

(52) U.S. Cl.
CPC ........ *H04W 28/10* (2013.01); *H04B 7/18532* (2013.01); *H04W 8/08* (2013.01); *H04W 24/10* (2013.01)

(58) Field of Classification Search
CPC ....... H04W 28/10; H04W 8/08; H04W 24/10; H04B 7/18532
See application file for complete search history.

(56) References Cited

U.S. PATENT DOCUMENTS 9,392,496 B2    7/2016  Low et al.
9,392,519 B2 *  7/2016  Zhu ...................... H04W 36/22
(Continued)

FOREIGN PATENT DOCUMENTS

WO    WO2018/203113 A1    11/2018

OTHER PUBLICATIONS

International Preliminary Report on Patentability dated Feb. 27, 2020 for International Application No. PCT/EP2017/070912 10 pages.

(Continued)

*Primary Examiner* — Chi H Pham
*Assistant Examiner* — Weibin Huang
(74) *Attorney, Agent, or Firm* — Tong, Rea, Bentley & Kim, LLC

(57) ABSTRACT

An apparatus which is able to communicate based on at least two communication methods, wherein each communication method is configured to communicate with access networks by using at least one subflow, acquires (S41) information from at least one of the communication methods for at least one of the subflows and provides (S42) the information to a subflow control entity at a higher layer of the apparatus. Based on the information, the subflow control entity evaluates (S43) whether a change will occur in the at least one of the subflows. In case the change is evaluated to occur in the at least one of the subflows, the subflow control entity evaluates (S44) when the change will occur, and evaluates (S45) whether the change evaluated to occur impacts a specific requirement of delivering packets by using the at least one of the subflows. In case the change is evaluated to impact the specific requirement, the subflow control entity changes (S46) usage of the subflows for delivering packets.

19 Claims, 8 Drawing Sheets

(51) Int. Cl.
*H04W 8/08* (2009.01)
*H04W 24/10* (2009.01)

(56) References Cited

U.S. PATENT DOCUMENTS

| | | | | |
|---|---|---|---|---|
| 9,871,723 | B2 * | 1/2018 | Teyeb | H04L 45/24 |
| 10,091,097 | B2 * | 10/2018 | Lin | H04L 69/16 |
| 10,143,001 | B2 * | 11/2018 | Schliwa-Bertling | H04W 76/18 |
| 10,306,692 | B2 * | 5/2019 | Zee | H04W 76/16 |
| 10,362,496 | B2 * | 7/2019 | Huang | H04L 41/0893 |
| 10,511,535 | B2 * | 12/2019 | Huang | H04L 47/122 |
| 10,523,794 | B2 * | 12/2019 | Kanagarathinam | H04W 80/06 |
| 10,587,498 | B2 * | 3/2020 | Zee | H04L 67/141 |
| 10,594,596 | B2 * | 3/2020 | Scahill | H04L 69/14 |
| 10,917,315 | B2 * | 2/2021 | Pan | H04W 4/029 |
| 11,025,586 | B2 * | 6/2021 | Vesterinen | H04L 5/0098 |
| 11,153,782 | B2 * | 10/2021 | Hwang | H04L 45/24 |
| 2009/0042576 | A1 | 2/2009 | Mukherjee et al. | |
| 2015/0373607 | A1 | 12/2015 | Zhu | |
| 2016/0373339 | A1 * | 12/2016 | Teyeb | H04L 45/22 |
| 2017/0127408 | A1 * | 5/2017 | Du | H04B 17/318 |
| 2019/0363974 | A1 * | 11/2019 | Wang | H04L 12/14 |

OTHER PUBLICATIONS

Karimi, P., et al., "Achieving High-Performance Cellular Data Services with Multi-Network Access," 2016 IEEE Global Communications Conference (GLOBECOM), Dec. 2016, 6 pages.

* cited by examiner

TRAFFIC DISTRIBUTION CONTROL FOR WIRELESS HYBRID ACCESS NETWORKS

CROSS-REFERENCE TO RELATED APPLICATIONS

The presentation application is a National Stage Entry application of PCT Patent Application Serial No. PCT/EP2017/070912, entitled "TRAFFIC DISTRIBUTION CONTROL FOR WIRELESS HYBRID ACCESS NETWORKS" and filed on Aug. 18, 2017, the entirety of which is incorporated by reference herein.

BACKGROUND OF THE INVENTION

Field of the Invention

The present invention relates to traffic distribution control for wireless hybrid access networks.

In particular, the present invention relates to the usage of hybrid networks that combine loosely coupled technologies for the support of mission critical use cases. Mission critical applications as referred to in this application demand high reliability (e.g. up to 99.999%) for the specified real-time requirement (e.g. 10-100 ms level). Those are also referred to as reliable real-time cyber-physical systems (CPS) and are distinguished from 3GPP ultra-reliability low-latency communications (URLLC) that target so-called "5-nines" reliability with down to 1 ms latency. For example, combining legacy 3GPP technologies, such as 2G and 3G, with latest LTE/NR radios, or combining the networks of two or more operators for optimal site and equipment diversity (multi-homing), or further combining 3GPP access with non-3GPP and non-integrated solutions such as Wi-Fi, Multefire, LoRa, and possibly even satellite networks, can be envisioned to realize such a wireless hybrid access network.

Related Background Art

MPTCP is a well-known technology, and networks assisted solutions are also envisioned. For example, according to network assisted multi-homing methods, routers and base stations reveal their capabilities in terms of current performance that can then be used as grounds for the multi-homing solutions for directing or redirecting traffic over different subflows.

While the above methods are very efficient, commitment from the network supplier is required that metrics from the networks are exposed so that they can be used by the multi-homing anchor or multipath proxy.

The following meanings for the abbreviations used in this specification apply:
ACK acknowledgement
AN access network/interface
AP access point
ARP allocation and retention priority
ARQ automatic repeat request
BW bandwidth
CN core network
CPS cyber-physical systems
ECN explicit congestion notification
eNB evolved nodeB
FC flow control
gNB next generation NB (5G NB)
HARQ hybrid ARQ
LAN local area network
LTE long-term evolution
IE information element
IEEE institute of electrical and electronics engineers (standardization body)
IETF internet engineering task force (standardization body)
IoT Internet of things
Mbps mega bits per second
MPTCP multi-path TCP
NR new radio (5G RAN)
OAM operation and management
PDAP PDCP application protocol
PDCP packet data convergence protocol
PDU protocol data unit
PLMN public land mobile network
QoS quality of service
RAN radio access network
RRC radio resource control
RTT round trip time
SDU service data unit
SoC system on a chip
SSID service set identifier
TCP transmission control protocol
TCP subflow A flow of TCP segments operating over an individual path, which forms part of a larger MPTCP connection. A subflow is started and terminated similar to a regular TCP connection. TCP segments are the individual units of data transmission that a message is divided into for efficient routing through the network.
UDP user datagram protocol
UE user equipment
UL uplink
URLLC ultra reliability low latency communications
WLAN wireless LAN

SUMMARY OF THE INVENTION

An object underlying at least some embodiments of the invention is an efficient traffic distribution control for hybrid access networks.

This is achieved by a method, apparatus and a non-transitory computer-readable medium as defined in the appended claims.

According to at least some embodiments of the invention, information is provided to a multipath traffic distribution in higher layers of an apparatus, e.g. a UE, IoT device, etc., directly by communication methods of the apparatus, e.g. using modems attached to the apparatus, and this information is used to control the traffic distribution.

With this arrangement, there is no need for a network operator to expose any network performance indicators to a traffic distribution controller.

In the following the invention will be described by way of embodiments thereof with reference to the accompanying drawings.

DESCRIPTION OF THE EMBODIMENTS

Figure 1:
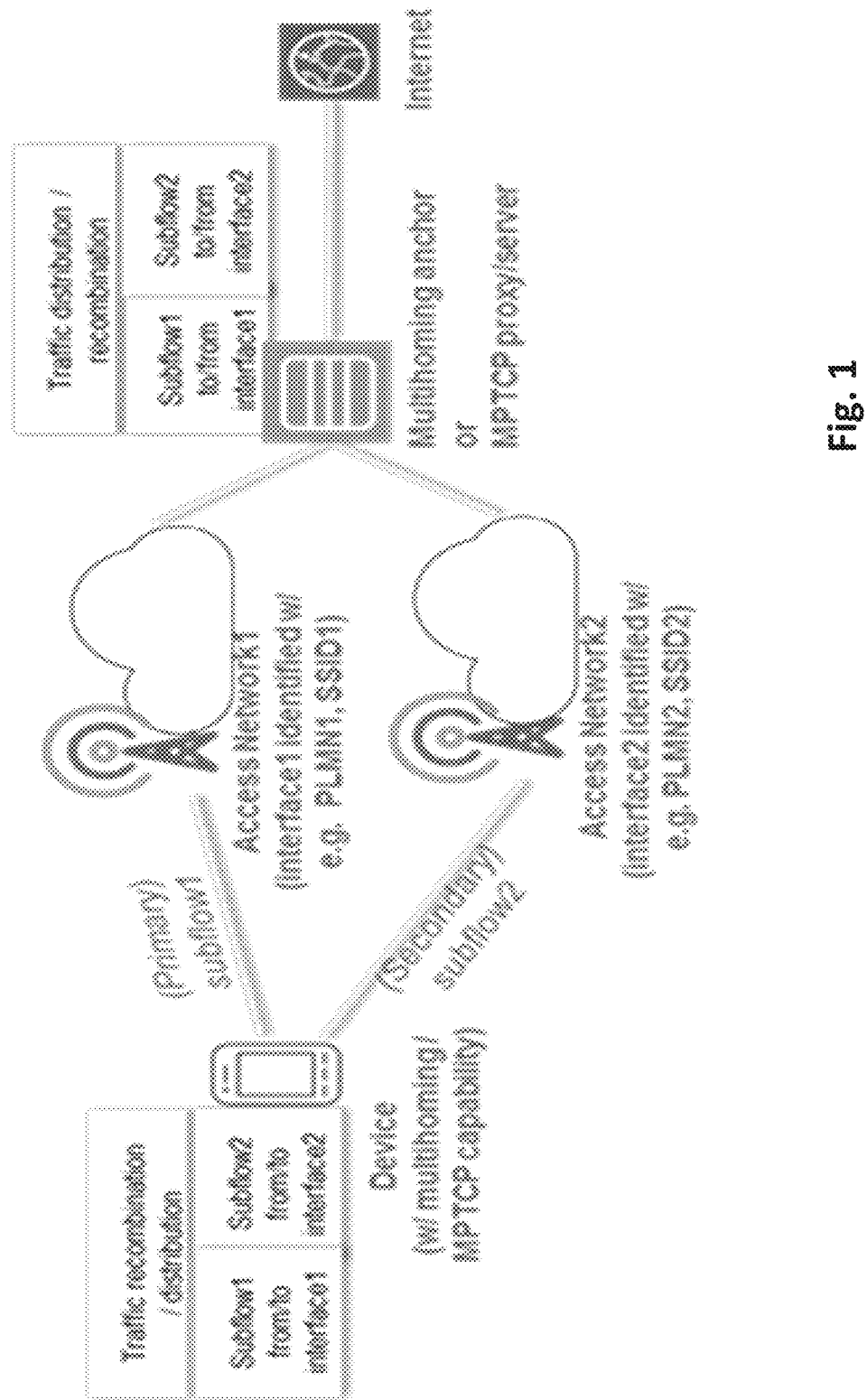
FIG. 1 shows a schematic diagram illustrating a hybrid network scenario with two underlying access networks.

At least some embodiments of the invention can be applied to a scenario illustrated in FIG. 1. FIG. 1 shows a hybrid network which comprises two underlying access networks. Those may belong to different operators (e.g. PLMN1/2) as well as use the same or different radio access technologies (e.g. LTE PLMN1, WLAN SSID2). Each access network is assumed as a black box. At one end, a multi-homing or Multi-Path TCP (MPTCP) capable device, connected simultaneously to both access networks, can combine traffic of a given application received by the two access networks, in the downlink direction. Likewise, in the uplink direction, the device can split traffic on a given application across the two access networks which is then recombined at the network side at a MPTCP proxy/server or multi-homing anchor point.

A problem addressed by at least some embodiments of the invention is the design of an efficient traffic distribution control at the bifurcation point (e.g. MPTCP proxy/server) from a network resources point of view. That is, how to efficiently control packet distribution over the two or multiple underlying accesses, yet being able to guarantee availability and reliability at a specified level (e.g. up to 99.999%) and for specified real-time requirement (e.g. 10-100 ms level), when assuming that each access is a black box for the controller, i.e. does not provide any network performance indications and/or metrics.

Figure 2:
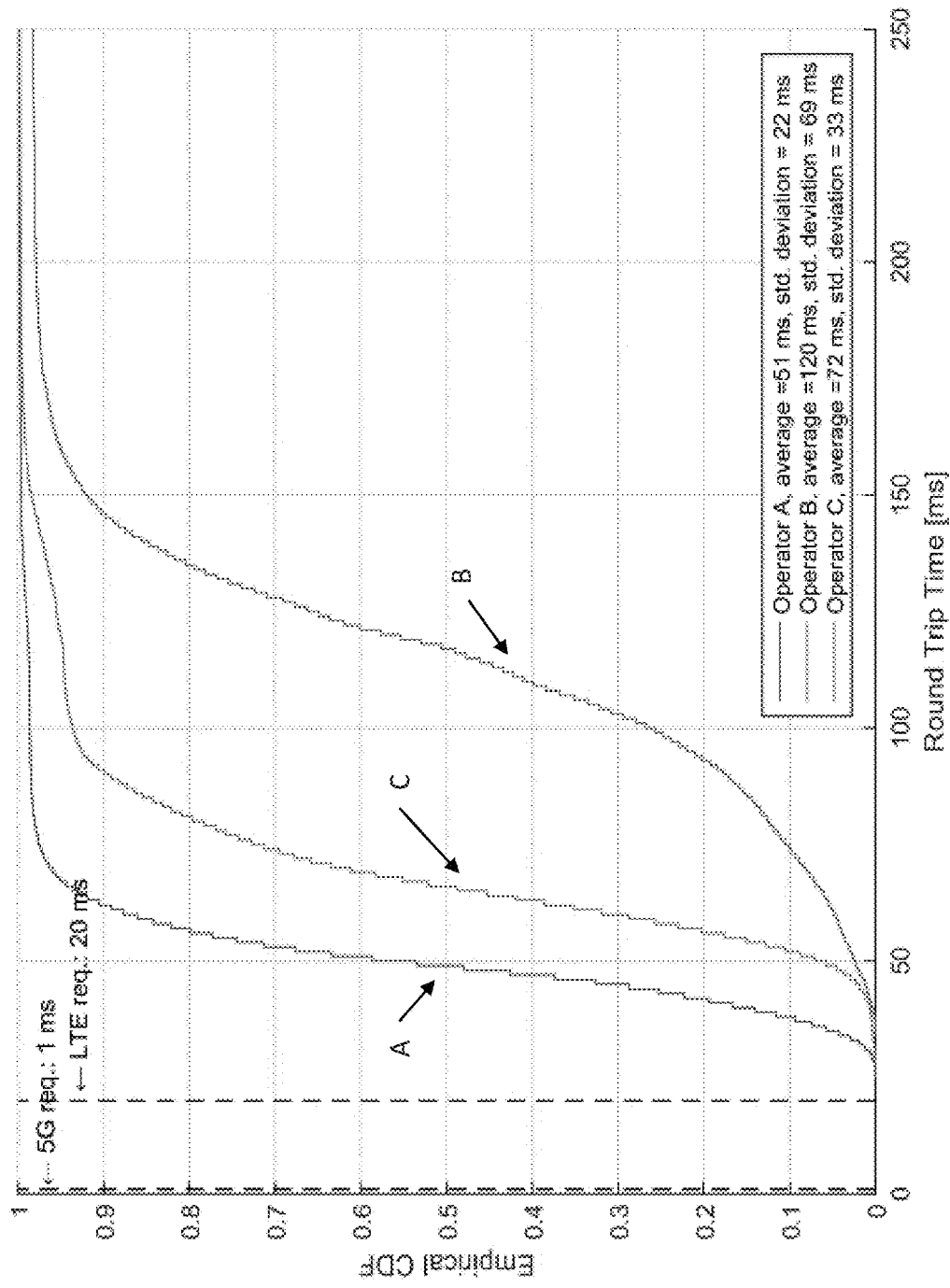
FIG. 2 shows a diagram illustrating LTE user-plane round trip time (RTT) for three different operators.
Figure 3:
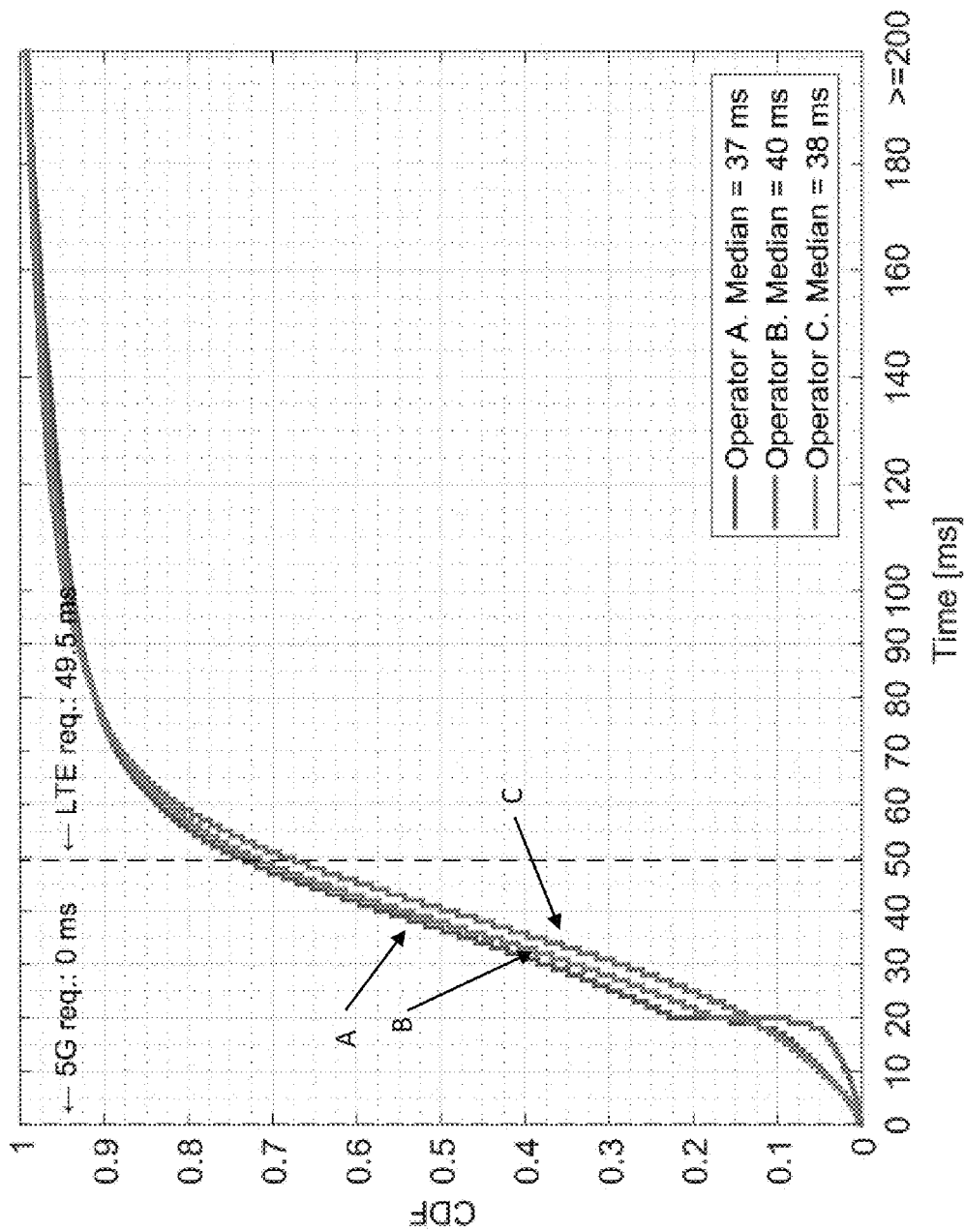
FIG. 3 shows a diagram illustrating LTE handover execution time for three different operators.

When wanting to achieve real-time performance in the 100 ms range, handovers become detrimental for the system regardless of the type of handover (intra-frequency, inter-frequency, intra-system, inter-system). In FIGS. 2 and 3, two examples from an extensive drive-test are compared, which are useful to understand the limitations of current technology as well as motivate the approach for hybrid mobile access. The performance of LTE networks from three different operators have been included. If as example a target real-time requirement of below 100 ms is considered then FIG. 2 shows that none of the networks, as it is, can deliver this performance at the 99.999% level. One operator is relatively close to the target, at least for the 100 ms requirement, achieving approximately 98-99% reliability (i.e. only 1-2% of the distribution has an RTT above 100 ms for Operator A). However, on top comes the challenge shown in FIG. 3, i.e. that each handover (e.g. when devices move from the serving cell to the target cell) may lead to a non-negligible interruption of the transmission (>100 ms in 5% of the cases). So from MPTCP perspective, it is clear that any handover will be detrimental for the system which targets reaching total latency <100 ms.

According to at least some embodiments of the invention, information, e.g. radio mobility level information, is provided to a multipath traffic distribution in higher layers of an apparatus, e.g. a subflow control entity, directly by communication methods of the apparatus e.g. using modems attached to the apparatus or included in the apparatus, and this information is used to control the traffic distribution. Hence, there is no need for a network operator to expose any network performance indicators to the controller.

It is to be noted that the present invention is not limited to TCP, UDP, or any other transmission protocol.

According to at least some embodiments of the invention, a subflow is a flow of segments operating over an individual path, which forms part of a larger connection. A subflow is started and terminated similar to a regular connection. Segments are the individual units of data transmission that a message is divided into for efficient routing through the network.

Moreover, according to at least some embodiments of the invention, a higher layer comprises at least one layer used for controlling one or more subflows, of a communication protocol used in the apparatus for communicating with the network.

Figure 4:
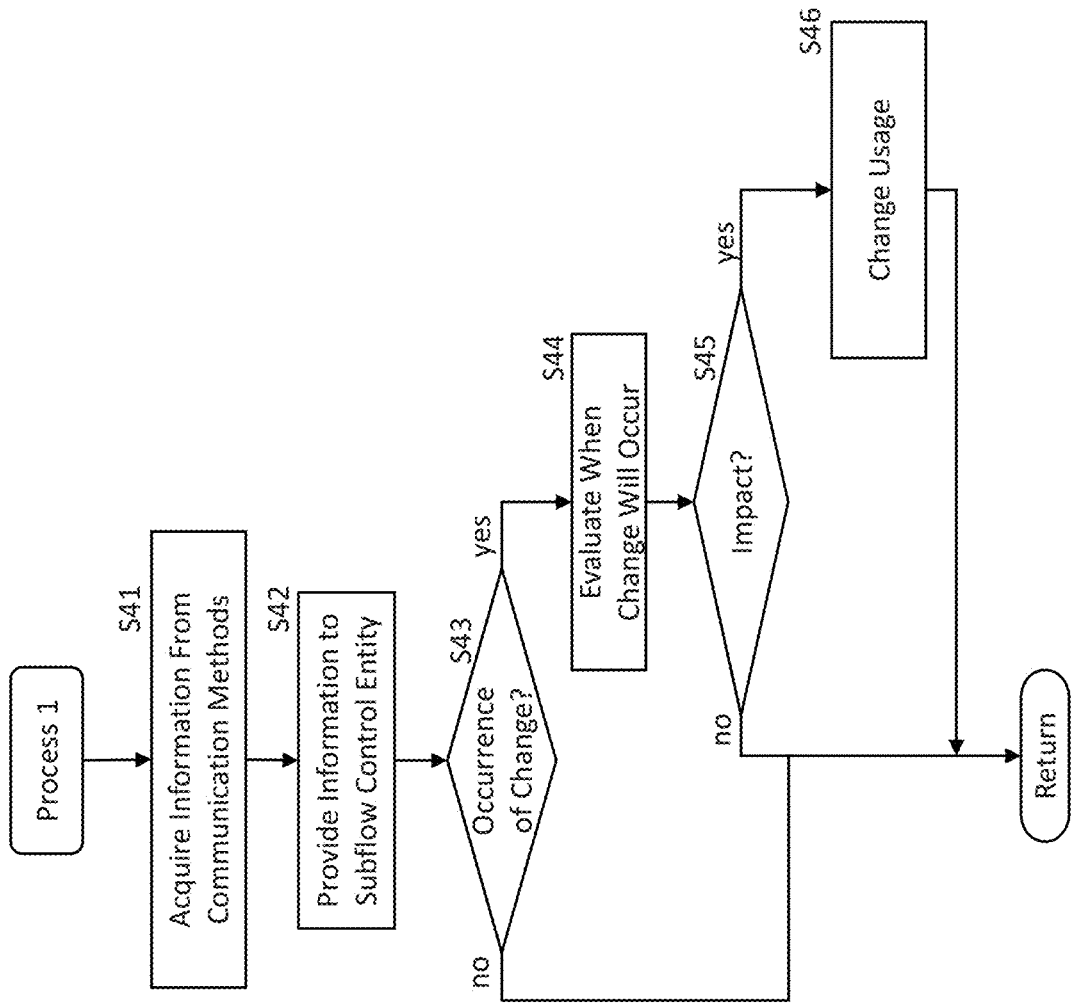
FIG. 4 shows a flowchart illustrating a process supporting traffic distribution control according to at least some embodiments of the invention.

Referring to FIG. 4, a flowchart is shown illustrating a process supporting traffic distribution control according to at least some embodiments of the invention. The process can be used by an apparatus which is able to communicate based on at least two communication methods, wherein each communication method is configured to communicate with access networks (e.g. the access networks shown in FIG. 1) by using subflows (e.g. primary and secondary subflows shown in FIG. 1). The apparatus may comprise a UE, IoT device, etc. The communication methods may use modems included in the apparatus or attached to the apparatus.

According to at least some embodiments of the invention, the at least two communication methods comprise at least one of a terrestrial radio communication method, a satellite radio communication method, and a fixed access communication method.

Further, according to at least some embodiments of the invention, the at least two communication methods comprise at least one radio communication method.

According to at least some embodiments of the invention, the communication methods (e.g. the at least one radio communication method) cover at least one of the following:

two or more modems (e.g. radio modems) in one physical chip;

using the same chip with multiple connections on the same chip e.g. in case of connections to two operators using the same modem, or in case of two connections to the same operator but separated in time; and a single modem, adopting time switching between operators.

Referring to FIG. 4, in step S41, information for at least one of the subflows is acquired from at least one of the communication methods. Then, the process advances to step S42.

In step S42, the information is provided to a subflow control entity at a higher layer of the apparatus. Then, the process advances to step S43.

In step S43, based on the information, the subflow control entity evaluates whether a change will occur in the at least one of the subflows.

In case the change is evaluated to occur in the at least one of the subflows (YES in step S43), the process advances to step S44 in which the subflow control entity evaluates when the change will occur. Then, the process advances to step S45.

Otherwise, in case the change is evaluated to not occur (NO in step S43), the process ends at least for the presently acquired information and returns to step S41. Process 1 may be performed as long as there is at least one subflow active.

In step S45, the subflow control entity evaluates whether the change evaluated to occur impacts, e.g. degrades or improves, a specific requirement of delivering packets by using the at least one of the subflows.

In case the change is evaluated to impact the specific requirement (YES in step S45), the process advances to step S46 in which the subflow control entity changes usage of the subflows for delivering packets. Thereafter, the process ends at least for the presently acquired information and returns to step S41.

Otherwise, in case the change is evaluated to not impact the specific requirement (NO in step S45), the process ends at least for the presently acquired information and returns to step S41.

Non-limiting examples of the information are measurement reporting event triggers defined in cellular radios, such as mobility events, which are to be exposed from a radio modem, such as an LTE modem, e.g. within an IoT device.

Figure 5:
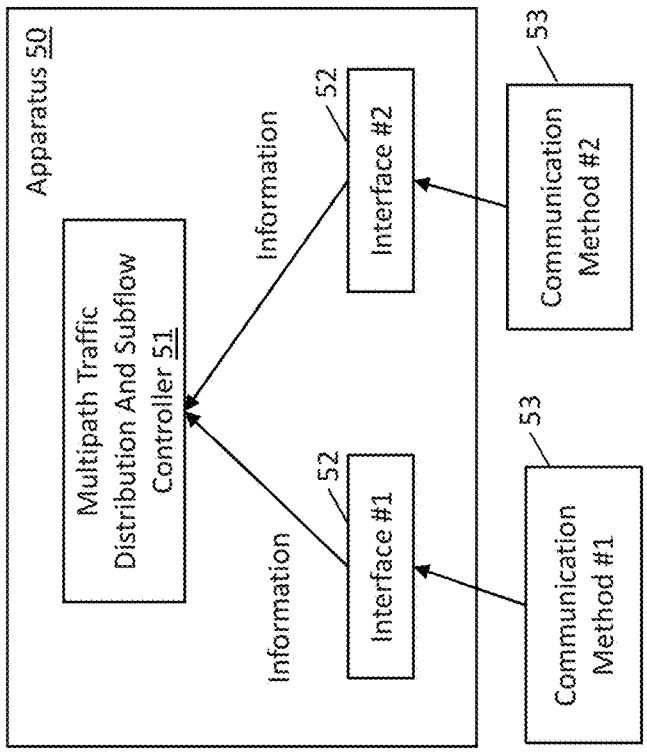
FIG. 5 shows a schematic block diagram illustrating a basic design according to at least some embodiments of the invention for the uplink case, where a traffic distribution controller is located at a higher layer of an apparatus and receives mobility event triggering.

A basic design according to at least some embodiments of the invention is shown in FIG. 5 illustrating an apparatus 50 which is configured to perform process 1 of FIG. 4. At least one of two (or more) communication methods 53, e.g. modems such as LTE modems, supply a controller (multipath traffic distribution and subflow controller, subflow control entity) 51 of the apparatus 50 with information e.g. relating to radio mobility level, such as measurement reporting event triggers. The communication methods 53 may be SoCs integrated into the apparatus 50 or may be dongles, e.g. LTE dongles, attached to the apparatus 50 via interfaces 52, e.g. USB ports. The apparatus 50 can be any device that leverages multiple communication methods to create reliable real-time connection, e.g. autonomous vehicles (cars, drones, ambulances, trains, ships, etc.).

According to at least some embodiments of the invention, at least one of the communication methods 53 is based on wireless and/or cellular technology where measurement reporting event triggers are well-defined, e.g. 2G, 3G, LTE, cdma 2000, Wi-Fi, etc.

According to at least some embodiments of the invention, the measurement reporting event triggers are defined and communicated to the controller 51 according to a well-defined protocol, e.g. agreed between IoT MPTCP vendor and radio communication method vendor, or defined in open API by the radio communication method vendor.

Figure 6:
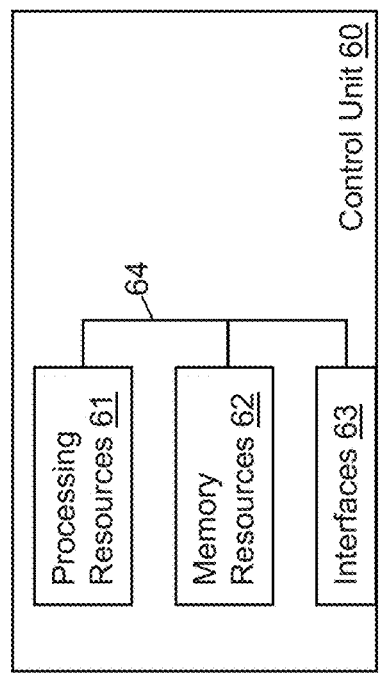
FIG. 6 shows a schematic block diagram illustrating a configuration of a control unit in which examples of embodiments of the invention are implementable.

FIG. 6 shows a control unit 60 in which examples of embodiments of the invention are implementable. The control unit 60 may be part of and/or used by an apparatus such as a UE, IoT device, etc., which is able to communicate based on at least two communication methods and which comprises a subflow control entity at a higher layer as described above.

The control unit 60 comprises processing resources (processing circuitry) 61, memory resources (memory circuitry) 62 and interfaces (interface circuitry) 63, which are linked by a connection 64.

The memory resources 62 store a program, and the interfaces 63 comprise suitable radio frequency (RF) transceivers (not shown) each coupled to one or more antennas (not shown) for bidirectional wireless communications over one or more wireless links with radio access networks.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory resources 62 is assumed to include program instructions that, when executed by the processing resources 61, enable the control unit 60 to operate in accordance with the exemplary embodiments of this invention. Inherent in the processing resources 61 is a clock to enable synchronism among the various apparatus for transmissions and receptions within the appropriate time intervals and slots required, as the scheduling grants and the granted resources/subframes are time dependent. The transceivers include both transmitter and receiver, and inherent in each is a modulator/demodulator commonly known as a modem.

In general, the exemplary embodiments of this invention may be implemented by computer software stored in the memory resources 62 and executable by the processing resources 61, or by hardware, or by a combination of software and/or firmware and hardware.

In general, the various embodiments of a UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 62 may be of any type suitable to the local technical environment and may be implemented using any suitable data storage technology, such as semiconductor based memory devices, magnetic memory devices and systems, optical memory devices and systems, fixed memory and removable memory. The processing resources 61 may be of any type suitable to the local technical environment, and may include one or more of general purpose computers, special purpose computers, microprocessors, digital signal processors (DSPs) and processors based on a multi core processor architecture, as non limiting examples.

According to at least some embodiments of the invention, measurement reporting event triggers are utilized as an "early warning" of mobility events that are imminent in the access network as well as indicating when conditions are again stabilizing.

For example, an eNB of a radio access network may configure an apparatus, e.g. a UE, IoT device, etc., to perform measurement reporting for a large number of measurement reporting events whose triggering are well-defined and include also WLAN RSSI based events (so-called W1-W3 events). The UE sends the corresponding measurement reports via RRC signaling to the serving eNB:

Event A1 (Serving becomes better than threshold)
Event A2 (Serving becomes worse than threshold)
Event A3 (Neighbor becomes offset better than PCell/PSCell)
Event A4 (Neighbor becomes better than threshold)

Event A5 (PCell/PSCell becomes worse than threshold1 and neighbor becomes better than threshold2)

Event A6 (Neighbor becomes offset better than SCell)

Event B1 (Inter RAT neighbor becomes better than threshold)

Event B2 (PCell becomes worse than threshold1 and inter RAT neighbor becomes better than threshold2)

Event W1 (WLAN becomes better than a threshold)

Event W2 (All WLAN inside WLAN mobility set becomes worse than threshold1 and a WLAN outside WLAN mobility set becomes better than threshold2)

Event W3 (All WLAN inside WLAN mobility set becomes worse than a threshold)

Figure 7:
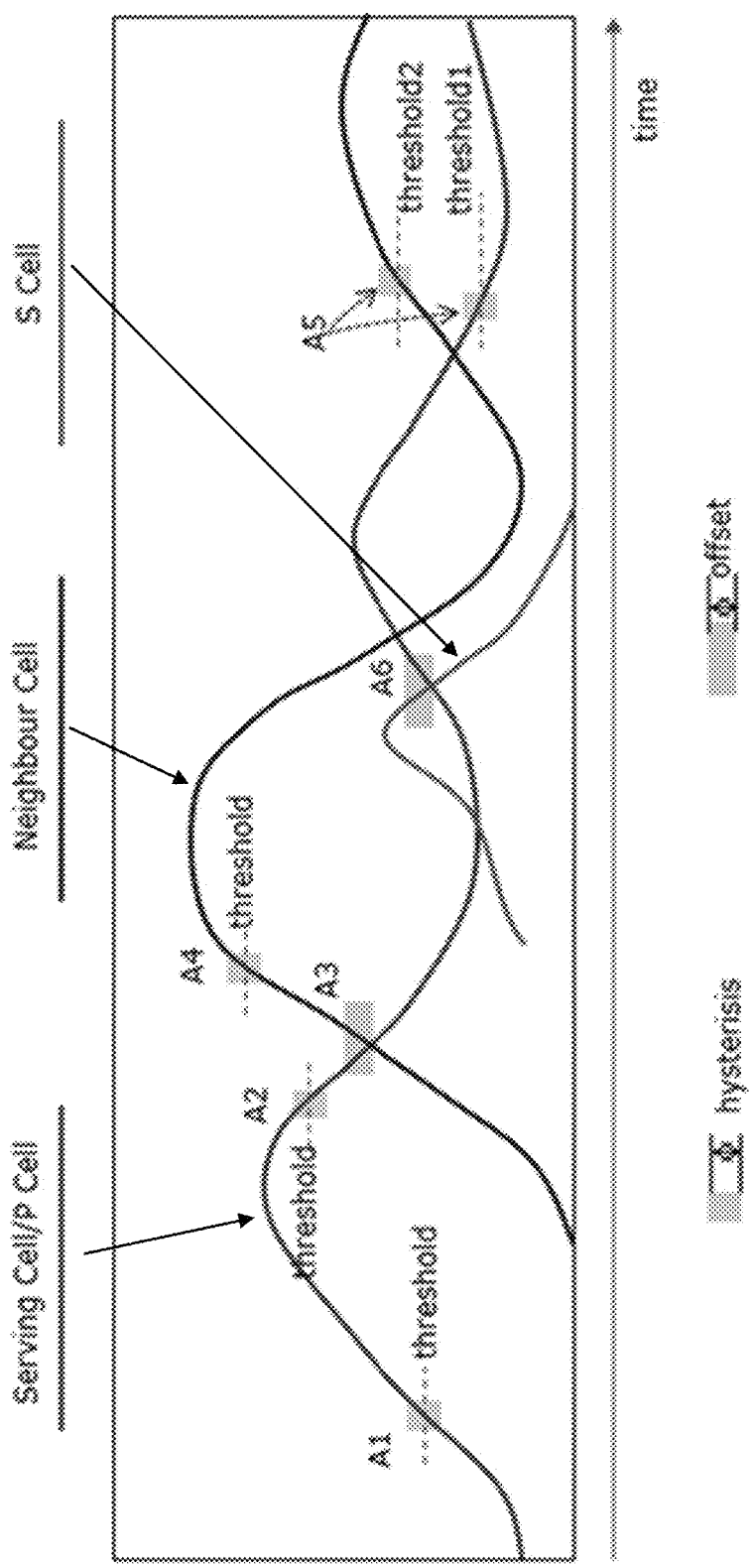
FIG. 7 shows a diagram illustrating handover triggers.

FIG. 7 illustrates examples of such measurement reporting event triggers.

In case measurement event A3 is triggered by the apparatus as an example, there is a high probability that actions will happen from the access network side based on this event. By directly utilizing these configured measurement events and associated parameters like time to trigger (TTT), according to at least some embodiments of the invention optimized handover measurement reporting that the access network operator and to some extent the access network vendor have already configured is utilized.

According to at least some embodiments of the invention, the controller 51—informed immediately about the triggering of certain mobility events, even prior to the related apparatus reporting being prepared for sending to the network via RRC signaling—leverages those mobility events to evaluate when a change, e.g. an upcoming handover, may occur in one or multiple subflows and whether that may threaten a system requirement of delivering packets with a certain reliable real-time requirement. In such case, the controller 51 determines an appropriate action to take in order to avoid the associated degradation, e.g. by means of activating/preferring a different subflow than the one potentially undergoing handover.

According to at least some embodiments of the invention, the measurement reporting event triggers communicated from the radio communication methods 53 to the controller 51 include the information shown in Table 1. Table 1 represents a minimum set, however, more metrics can be included.

TABLE 1

| Input in measurement report event message | Explanation |
| --- | --- |
| Time-stamp of measurement reporting event trigger | a measurement reporting event is to be communicated immediately to the controller 51 |
| Type of measurement reporting event trigger | E.g. the event type that has triggered the apparatus to create a handover measurement report. For LTE that for instance includes "A1", "A2", "A3", "W3", etc. |

The radio communication methods 53 may not be aware of the purpose of a measurement event it is configured with. I.e. the apparatus does not know how an event reporting will be used by the network, as for instance it could be used for performing a coverage-based handover, a load-balancing handover, or activating a different configuration (e.g. Scell change in CA, DC/LWA activation, etc.). Also, the same event can be used for multiple purposes, depending on the configured threshold values. For this reason, according to at least some embodiments of the invention, the communication methods 53 provide to the controller 51 any event or event subset when it gets triggered. The controller 51 evaluates the triggers in respect to the likelihood to indicate a change, e.g. an upcoming handover.

According to at least some embodiments of the invention, the controller 51 has learning capability in matching the triggering of a certain mobility event with an associated access network action. For example, the controller 51 monitors the relation between event reporting and following RRC handover command from the access network. This information is used by the controller 51 to further fine-tune the interpretation accuracy of the implications of a certain mobility event trigger.

Once the controller 51 has determined the likelihood of a change, e.g. an upcoming handover, it determines the most appropriate action. That is, the controller 51 acts in a specific way depending on a) the type of event that has taken place, b) current subflows usage, and c) reliability/real-time performance and its estimated degradation. Example actions to be taken by the controller 51 according to the received input is shown in Table 2.

According to at least one embodiment of the invention, access networks 1, 2 and subflows 1, 2 indicated in Table 2 refer to the scenario shown in FIG. 1, in which the MPTCP capable device implements the apparatus according to an embodiment of the invention, e.g. the apparatus of FIG. 5, performing process 1 of FIG. 4.

TABLE 2

| Received event on subflow 1 (Access network 1) | Received event on subflow 2 (Access network 2) | Controller's Action and rationale (example) |
| --- | --- | --- |
| A1 (active subflow) | None (inactive subflow) | Do nothing, subflow 1 has stabilized and is in OK quality |
| A3 or A5 (active subflow) | None (inactive subflow) | Enable/shift to subflow 2 as handover is very likely/imminent on subflow 1 |
| A2 (active subflow) | None (inactive subflow) | Enable/shift to subflow 2 as quality of active flow is deteriorating |
| A4 (active subflow) | None (inactive subflow) | As neighbor becomes now very good, it is likely that network will initiate handover soon. E.g. enable shift to subflow 2. |
| Any periodic (active subflow) | None (inactive subflow) | Periodic configured events can be discarded or can be used as "early" pointers towards the general gradient of the network performance (e.g. early indication that a subflow/scheduling change) is useful/needed. |

Figure 8:
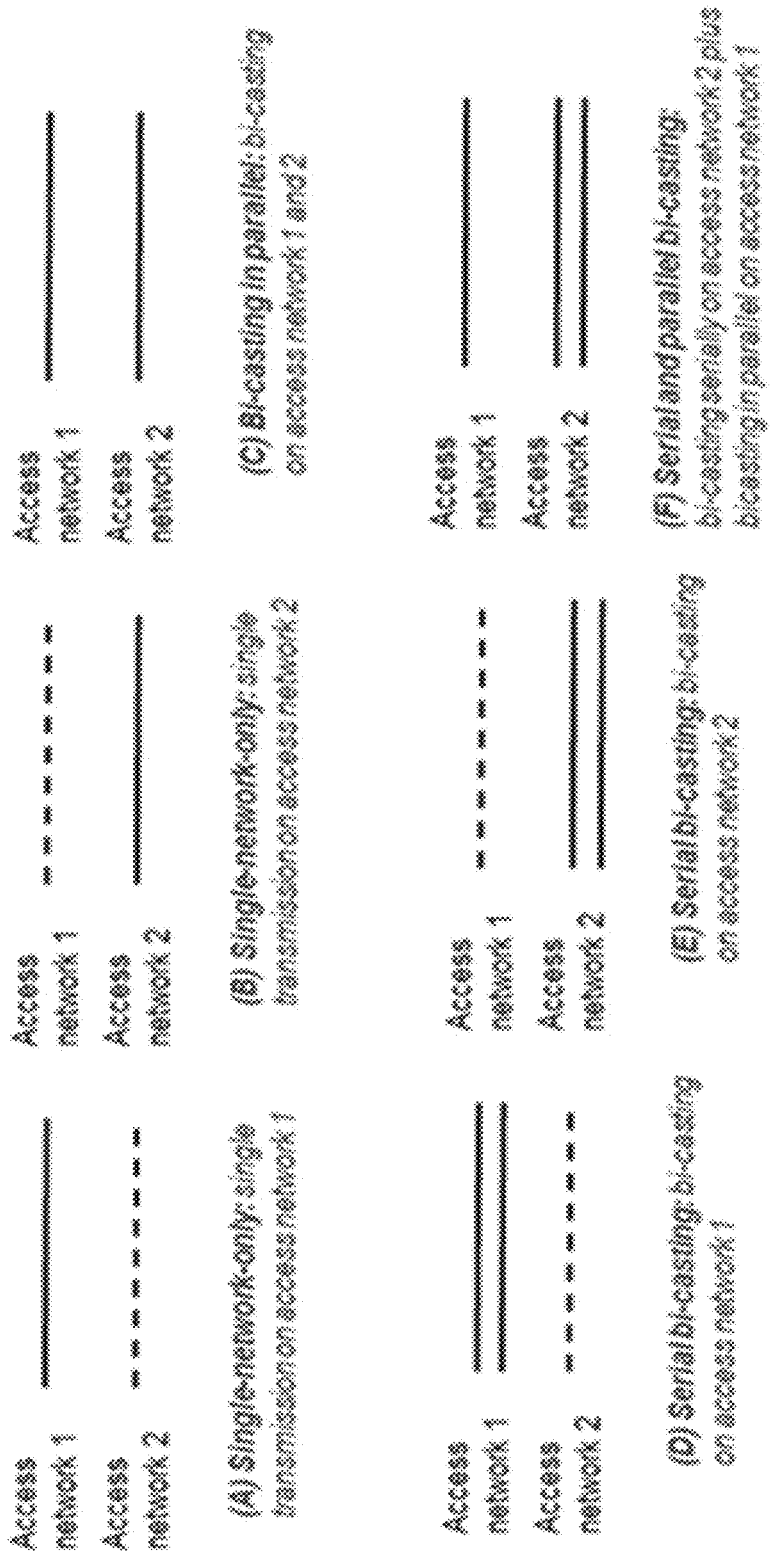
FIG. 8 shows a diagram illustrating examples A-F of different transmission distribution modes.

Subflow shifting options e.g. for traffic splitting represented in Table 2 is not exhaustive, as there are many scheduler and traffic distribution options available. Those options are illustrated in FIG. 8, e.g. instead of shifting the traffic entirely to subflow 2 (e.g. access network 2), bi-casting options may be chosen for better reliability. However, bi-casting requires more network resources than single transmission, as both access networks carry data.

Referring to FIG. 8, examples A and B illustrate performing single transmission on one of the access networks 1, 2. Example C illustrates performing parallel bi-casting on the access networks 1 and 2. Examples D and E illustrate performing serial bi-casting on one of the access networks 1, 2. Example F illustrates performing serial bi-casing on access network 2 plus parallel bi-casting on access network 1.

Referring to FIG. 4, changing usage of the subflows for delivering packets in step S46 comprises at least one of:

switching between single transmission, parallel bi-casting and serial bi-casting;

enabling a subflow of the subflows that is different from the subflow evaluated to undergo change;

shifting to a subflow of the subflows that is different from the subflow evaluated to undergo change;

changing order of packets to be delivered by using the at least one subflow; and changing order of packets to be delivered by using the at least one subflow by sending packets of low priority out of the packets to be delivered over a subflow of the subflows that is evaluated to be worst.

In Table 2 LTE communication methods are considered. However, the present invention is not limited to LTE communication methods and is applicable e.g. to multi-radio modems for which system measurements different from those of Table 1 as well as multi-radio event indicators (e.g. warning/likelihood of imminent inter-system handover, e.g. B1/B2 events) are defined.

Figure 9:
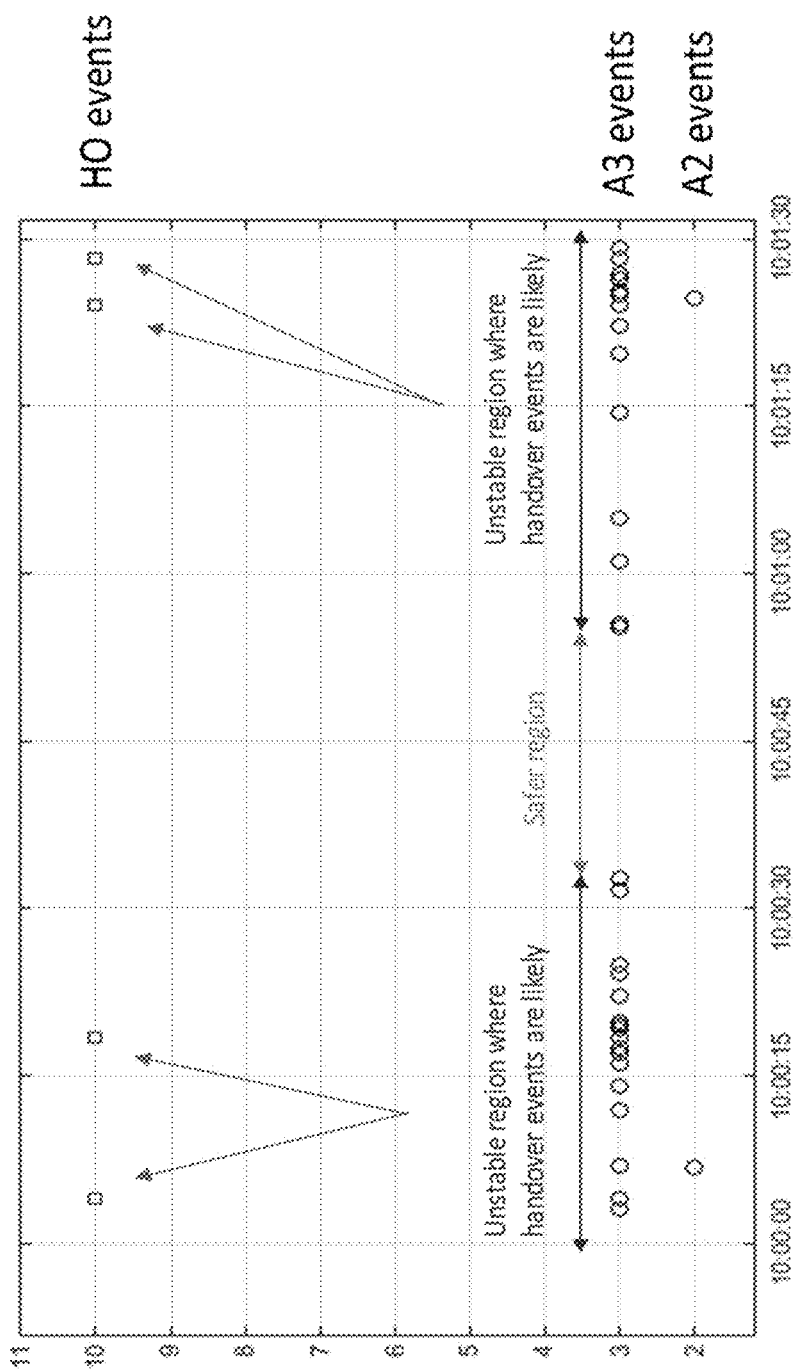
FIG. 9 shows a diagram illustrating a performance example of a drive test.

In a drive test illustrated in FIG. 9, information from an LTE communication method were collected and the indication and link between handover event and A2/A3 events corresponding to a single subflow were studied. With these metrics, different zones can be identified that have different probability for handover events happening. However, it is also clear from the test (FIG. 9 illustrates a very small snapshot of the complete 1½ h drive test) that filtering is needed to properly use this to guide the traffic distribution functionality across different subflows.

In at least one embodiment of the invention, internal operation of the controller 51 uses a state machine dealing with "safe region" and "unstable region", as shown in FIG. 9. According to the state machine, reception of one or more measurement reporting event triggers causes the controller 51 to enter the "unstable region", while a given time period without any measurement reporting event triggers causes the controller 51 to enter the "safe region". The safe region allows the controller 51 to operate using fewer parallel subflows, potentially down to a single flow.

It should be noted that the present invention is not limited to using two communication methods, but covers the case where there are more than two access technologies and more than two carriers as well. Such combinations can be any variant of GSM/GPRS, WCDMA, LTE, LTE-A, WiFi, CDMA-2000, 5G, MulteFire, etc. Basically, any system that provides a set of network configurable reporting mechanisms can be considered as part of the invention. Even variants of reporting across systems can be considered, for instance the W1 and W2 events for LTE based reporting of WiFi systems, but not limited thereto.

According to at least one embodiment of the invention, the various communication methods are configured with offsets according to their network configured triggers. That is, at least one of the communication methods 53 is configured to provide an "additional event trigger". In one example implementation of such operation, the communication method 53 is configured to shorten the time to trigger (TTT) for reporting upwards to the controller 51. In such a way, the controller 51 is aware of potential measurement reporting even triggers potentially happening in the communication method 53, and able to take actions even earlier.

According to at least some embodiments of the invention, the controller 51 configures at least one of the communication methods 53 to report only a subset of the configured measurement event triggers such that the amount of input data to the controller 51 is filtered on the communication method side.

Although the invention has been presented for the control of traffic splitting in the uplink direction, where signaling, evaluations and actions occur within the apparatus of FIG. 5, the invention can be applied to the downlink scenario as well. According to at least some embodiments of the invention, indicators that are received at the apparatus side are used generally to determine optimal policies in both directions by exchanging information between the end-points. For that purpose, some indication of an action such as an upcoming handover for the apparatus over a subflow is provided to a controller located at the access network side, using e.g. poll/request mechanism at higher layer, or piggy backing the indication in user-plane headers.

The indication may be provided from the apparatus side to the access network side as:

signaling of certain mobility events (such as the A5 event which may rather closely imply an upcoming handover), and/or signaling of the apparatus' indication that the likelihood of handover affecting a subflow is high in the immediate future (or higher than a threshold), and/or signaling of a handover decision taken by the apparatus (i.e. the controller 51) in case of autonomous apparatus mobility behavior e.g. under definition in LTE.

According to at least one embodiment of the invention, the entire control of multipath traffic distribution is located at apparatus side, meaning that nothing is revealed to the network in terms of how the apparatus addresses the management of the traffic flows. In another embodiment of the invention, the controller 51 is configured by a higher layer management system. That is, the priority of each flow and the associated measurement events that may be used for controlling the subflows are communicated to the apparatus through well-defined messages between a centralized element and the apparatus itself.

According to at least some embodiments of the invention, the controller 51 is enabled to get a priori information regarding potential system handovers within individual subflows and access networks. This allows the controller 51 to optimize the efficiency, e.g. reduce network overhead, apparatus battery consumption, etc., while ensuring reliable real-time operation. An alternative would be to always use e.g. parallel bi-casting which would have large overhead. With the proposed method according to at least some embodiments of the invention, it is possible to only enable bi-casting for lower overhead while still ensuring that handover events do not impact system performance. In this way, the MPTCP capable device of FIG. 1 can be optimized.

According to an aspect of the invention, an apparatus, e.g. a user equipment, IoT device, etc., is provided, which is able to communicate based on at least two communication methods, wherein each communication method is configured to communicate with access networks by using at least one subflow. The apparatus comprises means for acquiring information from at least one of the communication methods for at least one of the subflows, means for providing the information to a subflow control entity at a higher layer of the apparatus, means for, based on the information, evaluating by using the subflow control entity whether a change will occur in the at least one of the subflows, means for, in case the change is evaluated to occur in the at least one of the subflows, evaluating by using the subflow control entity when the change will occur, means for evaluating by using the subflow control entity whether the change evaluated to occur impacts a specific requirement of delivering packets by using the at least one of the subflows, and means for, in case the change is evaluated to impact the specific requirement, changing, by using the subflow control entity, usage of the subflows for delivering packets.

According to an implementation example of the above aspect, the at least two communication methods comprise a terrestrial radio communication method.

According to an additional or alternative implementation example of the above aspect, the at least two communication methods comprise a satellite radio communication method.

According to an additional or alternative implementation example of the above aspect, the at least two communication methods comprise a fixed access communication method.

According to an additional or alternative implementation example of the above aspect, the at least two communication methods comprise at least one radio communication method.

According to an implementation example of the above aspect, the information comprises radio mobility level information.

According to an additional or alternative implementation example of the above aspect, the change comprises a reconfiguration of a radio link corresponding to the at least one subflow.

According to an additional or alternative implementation example of the above aspect, the reconfiguration of the radio link comprises a handover.

According to an additional or alternative implementation example of the above aspect, the specific requirement comprises certain real-time requirements.

According to an additional or alternative implementation example of the above aspect, the certain real-time requirements comprise at least one or more of delay requirements and reliability requirements.

According to an additional or alternative implementation example of the above aspect, the radio mobility level information comprises measurement reporting event triggers configured previously by the access networks.

According to an additional or alternative implementation example of the above aspect, the apparatus comprises means for configuring at least one of the communication methods with offsets according to its measurement reporting event triggers configured previously by the access networks.

According to an additional or alternative implementation example of the above aspect, the apparatus comprises means for configuring at least one of the communication methods to provide a subset out of the measurement reporting event triggers and/or the offsets of the measurement reporting event triggers to the subflow control entity.

According to an additional or alternative implementation example of the above aspect, the radio mobility level information is provided from at least one of the communication methods to the subflow control entity in messages indicating time-stamps of the measurement reporting event triggers and types of the measurement reporting event triggers.

According to an additional or alternative implementation example of the above aspect, the access networks are operated by different operators.

According to an additional or alternative implementation example of the above aspect, the access networks use the same access technology.

According to an additional or alternative implementation example of the above aspect, the access networks use different access technologies.

According to an additional or alternative implementation example of the above aspect, the usage of the subflows comprises performing single transmission on one of the access networks.

According to an additional or alternative implementation example of the above aspect, the usage of the subflows comprises performing parallel bi-casting on at least two of the access networks.

According to an additional or alternative implementation example of the above aspect, the usage of the subflows comprises performing parallel bi-casting on at least two of the access networks comprises performing serial bi-casting on at least one of the access networks.

According to an additional or alternative implementation example of the above aspect, the means for changing usage of the subflows for delivering packets comprises means for switching between single transmission, parallel bi-casting and serial bi-casting.

According to an additional or alternative implementation example of the above aspect, the means for changing usage of the subflows for delivering packets comprises means for enabling a subflow of the subflows that is different from the subflow evaluated to undergo change.

According to an additional or alternative implementation example of the above aspect, the means for changing usage of the subflows for delivering packets comprises means for shifting to a subflow of the subflows that is different from the subflow evaluated to undergo change.

According to an additional or alternative implementation example of the above aspect, the means for changing usage of the subflows for delivering packets comprises means for changing order of packets to be delivered by using the at least one subflow.

According to an additional or alternative implementation example of the above aspect, the means for changing usage of the subflows for delivering packets comprises means for changing order of packets to be delivered by using the at least one subflow by sending packets of low priority out of the packets to be delivered over a subflow of the subflows that is evaluated to be worst.

According to an additional or alternative implementation example of the above aspect, the apparatus comprises means for matching, by using the subflow control entity, the information with commands issued by the access networks, and means for using, by using the subflow control entity, results of the matching when evaluating whether a change will occur.

According to an additional or alternative implementation example of the above aspect, the apparatus comprises means for providing information on the change evaluated to occur to the access networks.

According to an additional or alternative implementation example of the above aspect, the apparatus comprises means for communicating information on the subflows and evaluated change from the subflow control entity to a higher layer management system, and means for changing, by using the subflow control entity, usage of the subflows for delivering packets based on instructions received from the higher layer management system.

According to an additional or alternative implementation example of the above aspect, the apparatus comprises an Internet of things, IoT, device, the communication methods comprise modems, and the modems are part of the IoT device.

According to an additional or alternative implementation example of the above aspect, the modems are attached to the IoT device.

According to an implementation example of the invention, the above-described means for acquiring, providing, evaluating, changing, configuring, switching, enabling, shifting, matching, using and communicating are implemented by the processing resources 61, memory resources 62 and interfaces 63 of the control unit 60.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus configured to communicate based on at least two communication methods, wherein each communication method is configured to communicate with access networks by using at least one subflow, the method comprising:
    acquiring information from at least one of the communication methods for at least one of the subflows, the information comprising measurement reporting event triggers configured previously by the access networks;
    providing the information to a subflow control entity at a higher layer of the apparatus;
    based on the information, evaluating by the subflow control entity whether a change will occur in the at least one of the subflows;
    in case the change is evaluated to occur in the at least one of the subflows, evaluating by the subflow control entity when the change will occur;
    evaluating by the subflow control entity whether the change evaluated to occur impacts a specific requirement of delivering packets by using the at least one of the subflows; and
    in case the change is evaluated to impact the specific requirement, changing, by the subflow control entity, usage of the subflows for delivering packets.

2. The method of claim 1, wherein the at least two communication methods comprise at least one of a terrestrial radio communication method, a satellite radio communication method, and a fixed access communication method.

3. The method of claim 1, wherein the at least two communication methods comprise at least one radio communication method.

4. The method of claim 1, wherein the information comprises radio mobility level information.

5. The method of claim 1, wherein the change comprises a reconfiguration of a radio link corresponding to the at least one subflow.

6. The method of claim 5, wherein the reconfiguration of the radio link comprises a handover.

7. The method of claim 1, wherein the specific requirement comprises certain real-time requirements.

8. The method of claim 7, wherein the certain real-time requirements comprise at least one or more of delay requirements and reliability requirements.

9. A non-transitory computer-readable medium storing a program that causes an apparatus configured to communicate based on at least two communication methods, wherein each communication method is configured to communicate with access networks by using at least one subflow, to execute the following steps, when the program is run on the apparatus:
    acquiring information from at least one of the communication methods for at least one of the subflows, the information comprising measurement reporting event triggers configured previously by the access networks;
    providing the information to a subflow control entity at a higher layer of the apparatus;
    based on the information, evaluating by the subflow control entity whether a change will occur in the at least one of the subflows;
    in case the change is evaluated to occur in the at least one of the subflows, evaluating by the subflow control entity when the change will occur;
    evaluating by the subflow control entity whether the change evaluated to occur impacts a specific requirement of delivering packets by using the at least one of the subflows; and
    in case the change is evaluated to impact the specific requirement, changing, by the subflow control entity, usage of the subflows for delivering packets.

10. An apparatus configured to communicate based on at least two communication methods, wherein each communication method is configured to communicate with access networks by using at least one subflow, the apparatus comprising at least one processor and at least one memory including computer program code, the at least one memory and the computer program code configured to, with the at least one processor, cause the apparatus at least to perform:
    acquiring information from at least one of the communication methods for at least one of the subflows, the information comprising measurement reporting event triggers configured previously by the access networks;
    providing the information to a subflow control entity at a higher layer of the apparatus;
    based on the information, evaluating by the subflow control entity whether a change will occur in the at least one of the subflows;
    in case the change is evaluated to occur in the at least one of the subflows, evaluating by the subflow control entity when the change will occur;
    evaluating by the subflow control entity whether the change evaluated to occur impacts a specific requirement of delivering packets by using the at least one of the subflows; and
    in case the change is evaluated to impact the specific requirement, changing, by the subflow control entity, usage of the subflows for delivering packets.

11. The apparatus of claim 10, wherein the at least two communication methods comprise at least one of a terrestrial radio communication method, a satellite radio communication method, and a fixed access communication method.

12. The apparatus of claim 10, wherein the at least two communication methods comprise at least one radio communication method.

13. The apparatus of claim 10, wherein the at least one memory and the computer program code are configured to, with the at least one processor, cause the apparatus to perform:
    configuring at least one of the communication methods with offsets according to its measurement reporting event triggers configured previously by the access networks.

14. The apparatus of claim 13, wherein the at least one memory and the computer program code are configured to, with the at least one processor, cause the apparatus to perform:
    configuring at least one of the communication methods to provide a subset out of the measurement reporting event triggers and/or the offsets of the measurement reporting event triggers to the subflow control entity.

15. The apparatus of claim 10, wherein changing usage of the subflows for delivering packets comprises at least one of:
    switching between single transmission, parallel bi-casting and serial bi-casting;

enabling a subflow of the subflows that is different from the subflow evaluated to undergo change;

shifting to a subflow of the subflows that is different from the subflow evaluated to undergo change;

changing order of packets to be delivered by using the at least one subflow; and changing order of packets to be delivered by using the at least one subflow by sending packets of low priority out of the packets to be delivered over a subflow of the subflows that is evaluated to be worst.

16. The apparatus of claim 10, wherein the at least one memory and the computer program code are configured to, with the at least one processor, cause the apparatus to perform:

matching, by the subflow control entity, the information with commands issued by the access networks; and using, by the subflow control entity, results of the matching when evaluating whether a change will occur.

17. The apparatus of claim 10, wherein the at least one memory and the computer program code are configured to, with the at least one processor, cause the apparatus to perform:

providing information on the change evaluated to occur to the access networks.

18. The apparatus of claim 10, wherein the at least one memory and the computer program code are configured to, with the at least one processor, cause the apparatus to perform:

communicating information on the subflows and evaluated change from the subflow control entity to a higher layer management system; and changing, by the subflow control entity, usage of the subflows for delivering packets based on instructions received from the higher layer management system.

19. The apparatus of claim 10, wherein the apparatus comprises an Internet of things, IoT, device, the communication methods comprise modems, and the modems are part of the IoT device or are attached to the IoT device.

* * * * *